United States Patent
Bilik et al.

(10) Patent No.: US 10,690,750 B2
(45) Date of Patent: Jun. 23, 2020

(54) SYNCHRONIZATION OF SPATIALLY DISTRIBUTED RADAR

(71) Applicant: GM Global Technology Operations LLC, Detroit, MI (US)

(72) Inventors: Igal Bilik, Rehovot (IL); Alexander Pokrass, Bat Yam (IL); Shahar Villeval, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 478 days.

(21) Appl. No.: 15/413,753

(22) Filed: Jan. 24, 2017

(65) Prior Publication Data

US 2018/0210067 A1    Jul. 26, 2018

(51) Int. Cl.
| | |
|---|---|
| *G01S 7/40* | (2006.01) |
| *G01S 13/87* | (2006.01) |
| *G01S 13/931* | (2020.01) |
| *G01S 13/34* | (2006.01) |
| *G01S 13/00* | (2006.01) |

(52) U.S. Cl.
CPC .......... *G01S 7/4004* (2013.01); *G01S 13/003* (2013.01); *G01S 13/343* (2013.01); *G01S 13/87* (2013.01); *G01S 13/931* (2013.01)

(58) Field of Classification Search
CPC ............................. G01S 7/4004; G01S 13/003
See application file for complete search history.

(56) References Cited

U.S. PATENT DOCUMENTS

| | | | | |
|---|---|---|---|---|
| 7,940,743 | B2* | 5/2011 | Seisenberger | H04L 7/06 370/350 |
| 8,108,558 | B2* | 1/2012 | Kirsch | G04G 7/00 709/248 |
| 2006/0202726 | A1* | 9/2006 | Lin | H03L 7/0814 327/141 |
| 2015/0153445 | A1* | 6/2015 | Jansen | G01S 7/032 701/93 |
| 2016/0025844 | A1* | 1/2016 | Mckitterick | G01S 7/006 342/21 |
| 2017/0090015 | A1* | 3/2017 | Breen | G01S 13/87 |
| 2017/0176583 | A1* | 6/2017 | Gulden | G01S 13/50 |
| 2017/0227625 | A1* | 8/2017 | Markhovsky | G01S 1/042 |
| 2018/0024233 | A1* | 1/2018 | Searcy | G01S 7/032 342/125 |
| 2018/0074191 | A1* | 3/2018 | Bilik | G01S 13/93 |
| 2018/0149730 | A1* | 5/2018 | Li | G01S 13/931 |

* cited by examiner

*Primary Examiner* — Marcus E Windrich
(74) *Attorney, Agent, or Firm* — Cantor Colburn LLP

(57) ABSTRACT

A method of synchronizing a plurality of spatially distributed multi-input multi-output (MIMO) radar systems includes designating one of the plurality of MIMO radar systems that includes a linear frequency modulator as a master MIMO radar system, and designating each of the other plurality of MIMO radar systems as slave MIMO radar systems. Each of the slave MIMO radar systems receives an output of the linear frequency modulator. A synchronization signal is sent from the linear frequency modulator through the modulator splitter to each of the slave MIMO radar systems over respective cables, and a return signal is sent from each of the slave MIMO radar systems to the master MIMO radar system over the respective cables. A time delay is determined between the master MIMO radar system and each of the slave MIMO radar systems based on a frequency difference between the synchronization signal and the respective return signal.

11 Claims, 5 Drawing Sheets

SYNCHRONIZATION OF SPATIALLY DISTRIBUTED RADAR

INTRODUCTION

The subject invention relates to synchronization of spatially distributed radar.

Multi-input multi-output (MIMO) radar is used in many applications such as in vehicles (e.g., automobiles, construction equipment, farm equipment, automated factory equipment) or other platforms. The MIMO radar can facilitate obstacle detection for collision avoidance systems or automatic operation, for example. When multiple MIMO radar systems are used on the same platform (e.g., vehicle), the transmission by each transmitter of a given MIMO radar system results in reflections that are received by all the receivers of all the MIMO radar systems. Thus, synchronization is required among all the transmitters of all the MIMO radar systems in order to coherently process the various received reflections. Conventional synchronization is achieved by using a single signal source that is arranged to be equidistant from each of the MIMO radar systems. However, this arrangement limits the placement of the MIMO radar systems. Accordingly, it is desirable to provide synchronization of spatially distributed MIMO radar systems.

SUMMARY

In one exemplary embodiment, a method of synchronizing a plurality of spatially distributed multi-input multi-output (MIMO) radar systems includes designating one of the plurality of MIMO radar systems that includes a linear frequency modulator as a master MIMO radar system, and designating each of the plurality of MIMO radar systems other than the master MIMO radar system as slave MIMO radar systems. Each of the slave MIMO radar systems receives an output of the linear frequency modulator through a modulator splitter. A synchronization signal is sent from the linear frequency modulator through the modulator splitter to each of the slave MIMO radar systems over respective cables, and a return signal is sent from each of the slave MIMO radar systems to the master MIMO radar system over the respective cables. A time delay between the master MIMO radar system and each of the slave MIMO radar systems is determined based on a frequency difference between the synchronization signal and the respective return signal.

In addition to one or more of the features described herein, sending the synchronization signal includes sending a signal at a lower frequency than a regular signal transmitted during normal operation.

In addition to one or more of the features described herein, sending the synchronization signal includes sending a linear frequency modulated signal.

In addition to one or more of the features described herein, determining the time delay includes mixing, using a mixer, the return signal from each of the slave MIMO radar systems with the synchronization signal and filtering an output of the mixer to isolate a difference between the synchronization signal and the respective return signal.

In addition to one or more of the features described herein, the method also includes using the time delay to process subsequent received reflections by the master MIMO radar system and each of the slave MIMO radar systems resulting from a transmission by a transmission element of one of the slave MIMO radar systems.

In another exemplary embodiment, a plurality of multi-input multi-output (MIMO) radar systems on a platform includes a master MIMO radar system among the plurality of MIMO radar systems. The master MIMO radar system includes a linear frequency modulator. The plurality of MIMO radar systems also includes slave MIMO radar systems among the plurality of MIMO radar systems. The slave MIMO radar systems are all the plurality of MIMO radar systems other than the master MIMO radar system. Each of the slave MIMO radar systems receives an output of the linear frequency modulator through a modulator splitter as a synchronization signal over respective cables and sends a return signal to the master MIMO radar system over the respective cables. A processor of the master MIMO radar system determines a time delay between the master MIMO radar system and each of the slave MIMO radar systems based on a frequency difference between the synchronization signal and the respective return signal.

In addition to one or more of the features described herein, the synchronization signal is at a lower frequency than a regular signal transmitted during normal operation of the plurality of MIMO radar systems.

In addition to one or more of the features described herein, the synchronization signal is a linear frequency modulated signal.

In addition to one or more of the features described herein, the plurality of MIMO radar systems includes a plurality of mixers each configured to mix the synchronization signal and the respective return signal of each slave MIMO radar system and a plurality of filters each configured to filter an output of the respective mixer to isolate a difference between the synchronization signal and the respective return signal. The processor uses the difference to determine the time delay.

In addition to one or more of the features described herein, the receiver section of the master MIMO radar system uses the time delay to process subsequent received reflections resulting from a transmission by a transmission element of one of the slave MIMO radar systems.

In addition to one or more of the features described herein, the platform is an automobile.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
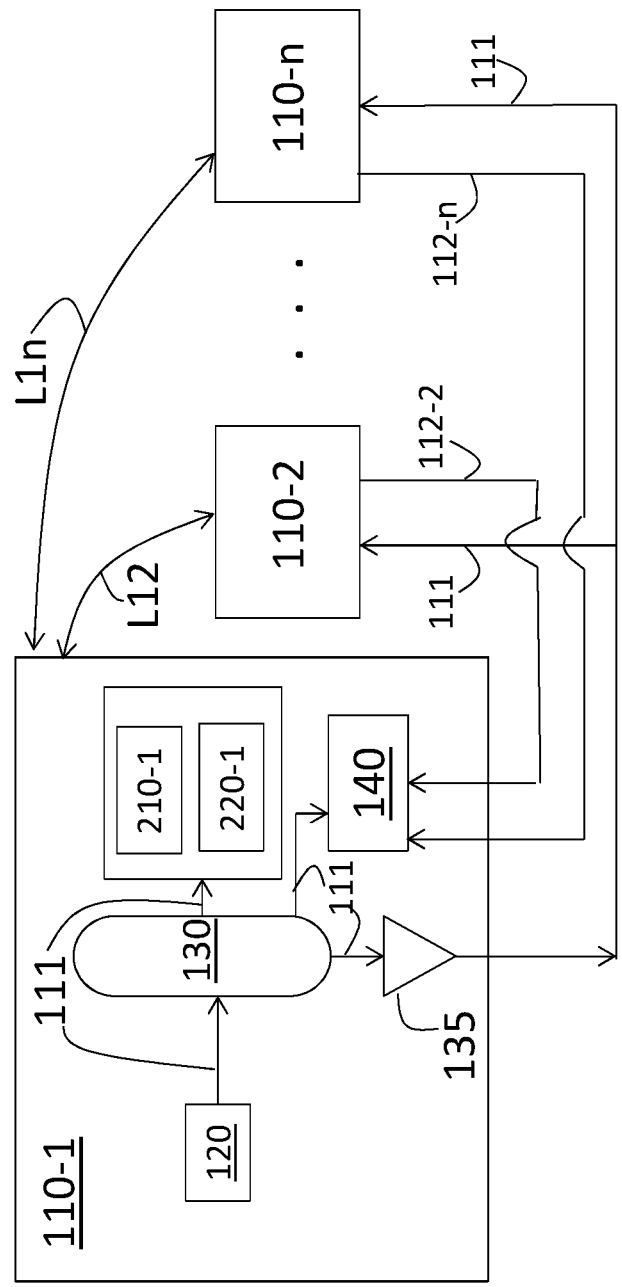
FIG. 1 is a block diagram of a sensor scheme that includes multiple multi-input multi-output (MIMO) radar systems that are synchronized according to one or more embodiments.

The following description is merely exemplary in nature and is not intended to limit the present disclosure, its application or uses. It should be understood that throughout the drawings, corresponding reference numerals indicate like or corresponding parts and features.

As previously noted, MIMO radar systems can be used for object detection or tracking in various applications such as, for example, vehicle control. Each MIMO transmitter generally transmits a signal with linear frequency modulation (LFM) (i.e., a chirp signal). Known synchronization techniques include using a single LFM modulator disposed equidistant to each of the transmitters. As further noted, this conventional synchronization method is not feasible when the MIMO radar systems are spatially distributed. This is because phase coherency is lost when a typical signal frequency (e.g., 77 gigahertz (GHz)) that is used in applications such as in vehicles is distributed over ranges on the order of two or more meters. Embodiments of the systems and methods detailed herein relate to synchronizing multiple MIMO radar based on a delay associated with a distance between a designated a master MIMO radar system and each slave MIMO radar system. The synchronization process can be performed at an intermediate frequency (e.g., on the order of 20 GHz) that is lower than the typical operating frequency of the MIMO radar systems.

In accordance with an exemplary embodiment of the invention, FIG. 1 is a block diagram of a sensor scheme that includes multiple MIMO radar systems 110-1 through 110-n (generally referred to as 110). The MIMO radar system 110-1, which includes the linear frequency modulator 120, is the master, and the other MIMO radar systems 110-2 through 110-n are slaves in the synchronization process according to one or more embodiments. The slave MIMO radar systems 110-2 through 110-n are generally referred to with the index i as 110-i. The LFM signal 111 from the linear frequency modulator 120 is output, through a splitter 130, to the transmitter section 210-1 and receiver section 220-1 of the master MIMO radar system 110-1, a signal processor 140, and through an amplifier 135 to each of the slave MIMO radar systems 110-2 through 110-n.

The distance from the master MIMO radar system 110-1 to the MIMO radar system 110-2 is L12, and the distance from the master MIMO radar system 110-1 to the MIMO radar system 110-n (i.e., the length of cable) is L1n (generally L1i from the master MIMO radar system 110-1 to each MIMO radar system 110-i). Synchronization is based on the delay between transmission of the LFM signal 111 from the master MIMO radar system 110-1 and reception of the return signals 112-2 through 112-n. This delay is based on the delay in the cables of lengths L12 through L1n (generally L1i). This is further detailed with reference to FIGS. 2-4.

Figure 2:
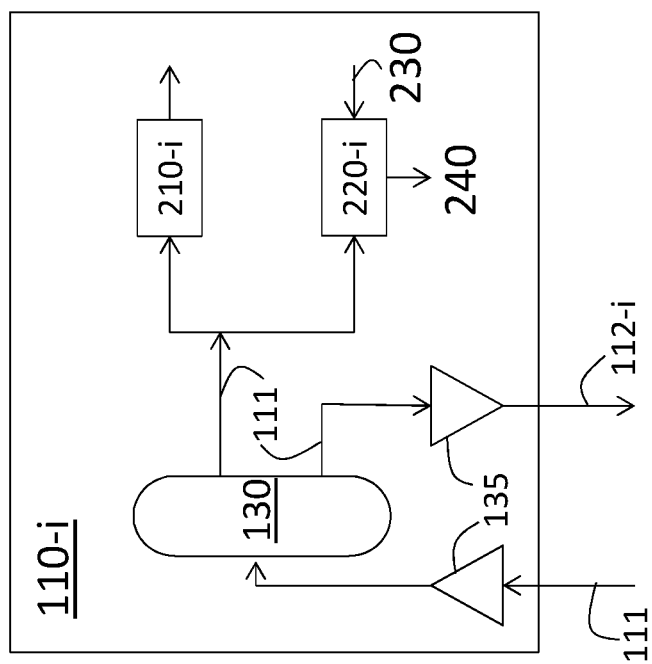
FIG. 2 is a block diagram of a slave MIMO radar system according to one or more embodiments.

FIG. 2 is a block diagram of a slave MIMO radar system 110-i according to one or more embodiments. The MIMO radar system 110-i includes a splitter 130 that splits the LFM signal 111 that is provided by the master MIMO radar system 110-1 and amplified by the amplifier 135. One output of the splitter 130 (the amplified LFM signal 111) is amplified by an amplifier 135 as the return signal 112-i. This return signal 112-i is used in the synchronization process. As previously noted, during the synchronization process, when this return signal 112-i is of interest, the LFM signal 111 can be on the order of 20 GHz.

The other output of the splitter 130 is provided to the transmitter section 210-i and the receiver section 220-i. During normal operation, after the synchronization process is completed, this output of the splitter 130 is of interest, and the frequency of the LFM signal 111 is the operating frequency (e.g., on the order of 77 GHz). The transmitter section 210-i includes multiple transmitter elements that transmit the LFM signal 111 in turn, and the receiver section 220-i includes multiple receiver elements that all receive reflections resulting from the transmitted signals of each of the transmitter elements. The receiver section 220-i also includes other known receiver components to perform correlation of the received reflection 230 at each receiver element with the transmitted signal to obtain a processor output 240.

Figure 3:
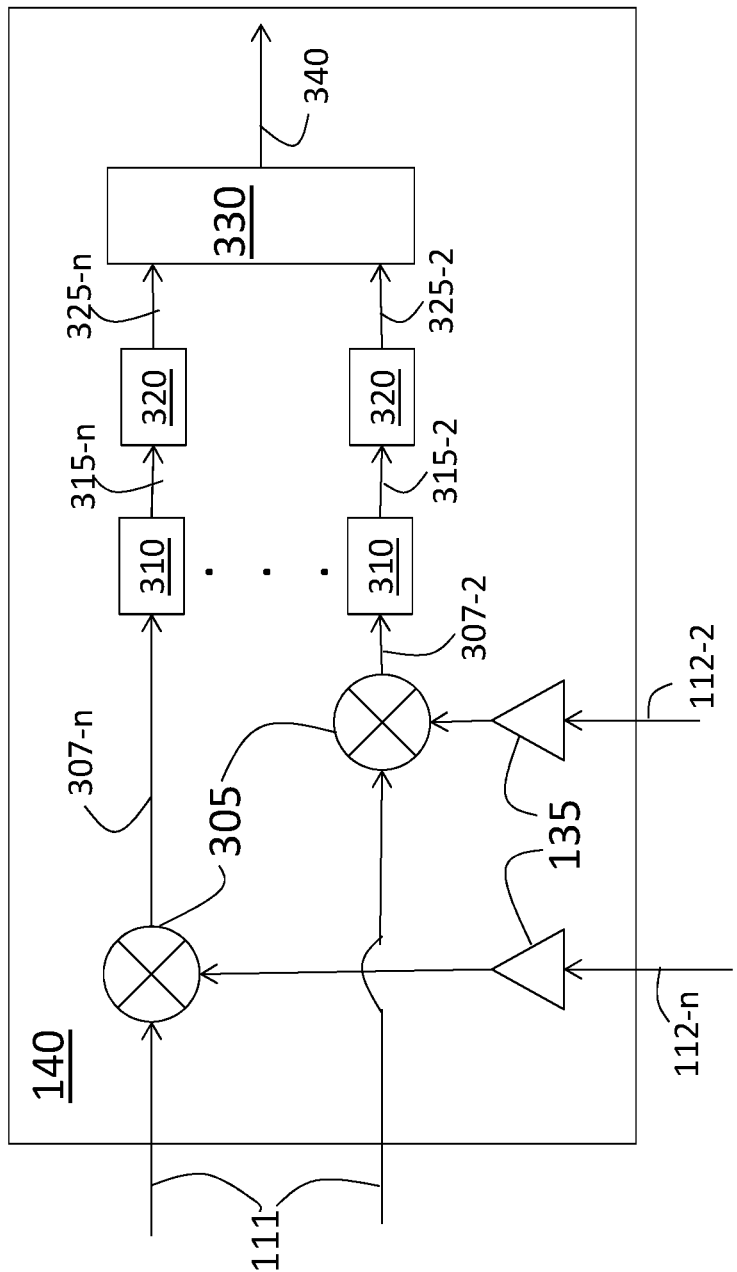
FIG. 3 is a block diagram detailing relevant aspects of the signal processor 140 used to synchronize the MIMO radar systems according to one or more embodiments.

FIG. 3 is a block diagram detailing relevant aspects of the signal processor 140 used to synchronize the MIMO radar systems 110 according to one or more embodiments. Each of the slave MIMO radar systems 110-i provides a return signal 112-i to the signal processor 140. As FIGS. 1 and 2 indicate, no actual transmission is performed during the synchronization process. Thus, there are no reflections received by any of the MIMO radar systems 110. Instead, the return signals 112-i are the LFM signal 111 provided through the cables and returned through the cables. Each return signal 112-i is multiplexed by a multiplexer 305 with the LFM signal 111 provided to the signal processor 140 through the splitter 130. The multiplexer output 307-i includes the sum and difference components (i.e., sum and difference of the LFM signal 111 and return signal 112-i), but the difference component is of interest in determining the delay in the cables. Thus, this multiplexer output 307-i is provided to a low pass filter (LPF) 310 to filter out the sum component and obtain output 315-i (the difference component) followed by an analog-to-digital converter (ADC) 320. The output 325-i of every ADC converter 320 is input to a processor 330 to obtain delay values dTi 340 associated with each of the slave MIMO radar systems 110-i, as detailed with reference to FIG. 4. The processor 330 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The processor 330 can provide the respective dTi 340 value to each slave MIMO radar system 110-i for use in the processing of received reflections 230 during normal operation.

Figure 4:
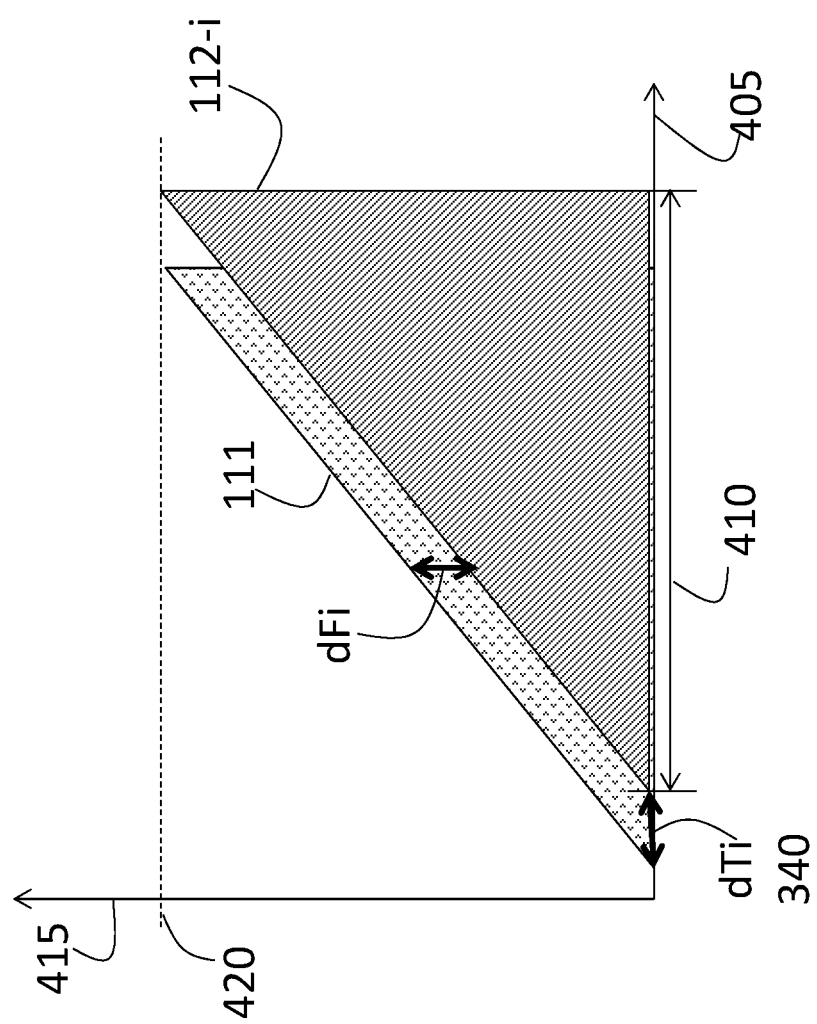
FIG. 4. shows an exemplary linear frequency modulation signal and output signal used to synchronize MIMO radar systems according to one or more embodiments.

FIG. 4 shows an exemplary LFM signal 111 and return signal 112-i used to synchronize MIMO radar systems 110 according to one or more embodiments. Time is shown on axis 405, and frequency is shown on axis 415. As FIG. 4 indicates, each chirp (LFM signal 111 and output signal 112-i) has a time duration of Tchirp 410, and a maximum frequency of Fmax 420. As FIG. 4 also indicates, the time difference between transmission of the LFM signal 111 and reception of the return signal 112-i from a slave MIMO radar system 110 is dTi 340. This is the value of interest in the synchronization process and is given by:

$$dTi = 2\frac{L1i}{c} \quad \text{[EQ. 1]}$$

As EQ. 1 indicates, the delay dTi 340 associated with a given slave MIMO radar system 110-i is a function of the distance L1i between the master MIMO radar system 110-1 and the given slave MIMO radar system 110-i and the speed of light c. This value can be obtained through the shift in frequency dFi at any given time during the chirp duration Tchirp 410 that results from the delay dTi 340. The frequency difference dFi is also due to the delay in the cable based on its length L1i.

The frequency difference dFi is given by:

$$dFi = dTi*K \quad [EQ. 2]$$

The slope K is constant and is given by:

$$K = \frac{F\max}{Tchirp} \quad [EQ. 3]$$

Generally, the return signal 112-i is given by:

$$Ae^{j(2\pi(f_0+Kt)t+\varphi)} \quad [EQ. 4]$$

In EQ. 4, A is the amplitude, $f_0$ is the initial frequency of the LFM signal 111, and φ is the phase shift due to the distance L1i. After multiplication by the multiplier 305 and filtering by the LPF 310, the output 315-i is given by:

$$Be^{j(2\pi(KdTi)t)} \quad [EQ. 5]$$

In EQ. 5, B is the amplitude, and, according to EQ. 2, the frequency difference or shift dFi is given by K*dTi. Thus, the frequency difference dFi can be obtained from the outputs 325-i (i.e., digitized version of outputs 315-i) by the processor 330. The values of dFi and dTi 340 associated with each slave MIMO radar system 110-i give the delay between the master MIMO radar system 110-1 and each slave MIMO radar system 110-i. The delays among the slave MIMO radar systems 110-i can then be determined with the master MIMO radar system 110-1 as a common reference. This synchronization process then facilitates improved processing of the received reflection at each slave MIMO radar system 110-i.

During normal operation, when a transmit element of one of the slave MIMO radar system 110-i transmits the LFM signal 111, the dTi 340 value determined using EQ. 5 is used to process the received signal 230 at the master MIMO radar system 110-1. If the received signal 230 were correlated with a non-delayed version of the LFM signal 111 transmitted by a slave MIMO radar system 110-i, a loss of phase coherency would result. Thus, the delay due to the distance L1i is accounted for, and the LFM signal 111 delayed by the corresponding dTi 340 for each slave MIMO radar system 110-i is correlated with the received signal 230 instead. This delay need not be accounted for when the master MIMO radar system 110-1 transmits. Further, when a transmit element of the transmitter section 210-i of one of the slave MIMO radar system 110-i transmits the LFM signal 111, then the delay used by other slave MIMO radar systems 110-i is determined by using the delay of each slave MIMO radar system 110-i relative to the master MIMO radar system 110-1 as a reference.

Figure 5:
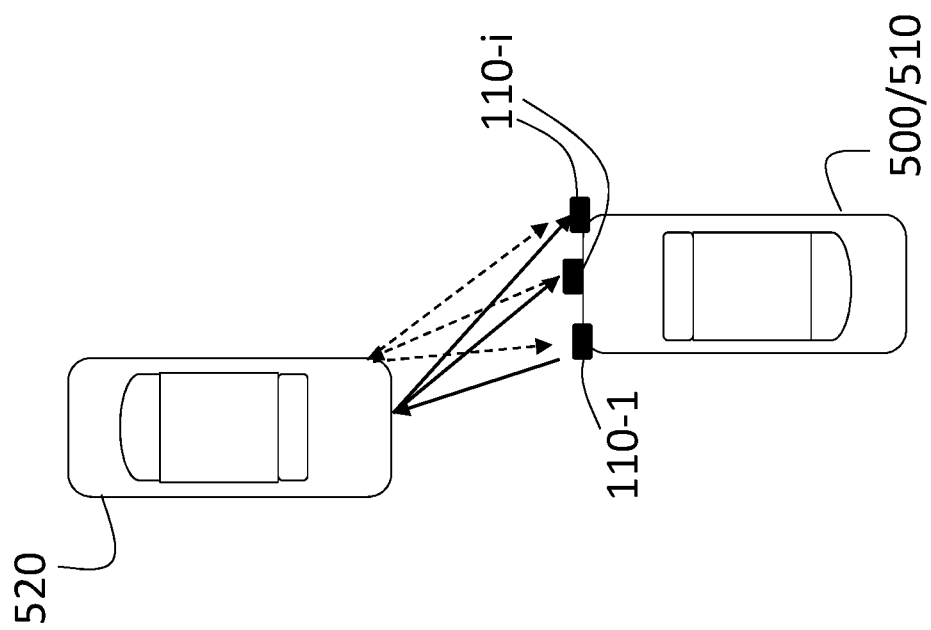
FIG. 5 is a block diagram of multiple MIMO radar systems on a platform that are synchronized according to one or more embodiments.

FIG. 5 is a block diagram of multiple MIMO radar systems 110 on a platform 500 that are synchronized according to one or more embodiments. The platform 500 shown in FIG. 5 is an automobile 510, but, as previously noted, the one or more embodiments apply to another vehicle or other platform 500 that includes spatially separated MIMO radar systems 110. Three MIMO radar systems 110 are indicated in FIG. 5, one master MIMO radar system 110-1 and two slave MIMO radar systems 110-i, where the index has the values 2 and 3 in the exemplary case. Transmitted signals and resulting reflections are also indicted in FIG. 5.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the description not be limited to the particular embodiments disclosed, but will include all embodiments falling within the scope of the application.

What is claimed is:

1. A method of synchronizing a plurality of spatially distributed multi-input multi-output (MIMO) radar systems, the method comprising:
    designating one of the plurality of MIMO radar systems that includes a linear frequency modulator as a master MIMO radar system;
    designating each of the plurality of MIMO radar systems other than the master MIMO radar system as slave MIMO radar systems, wherein each of the slave MIMO radar systems receives an output of the linear frequency modulator through a modulator splitter;
    sending a synchronization signal from the linear frequency modulator through the modulator splitter to each of the slave MIMO radar systems over respective cables;
    sending a return signal from each of the slave MIMO radar systems to the master MIMO radar system over the respective cables; and
    determining a time delay between the master MIMO radar system and each of the slave MIMO radar systems based on a frequency difference between the synchronization signal and the respective return signal.

2. The method according to claim 1, wherein the sending the synchronization signal includes sending a signal at a lower frequency than a regular signal transmitted during normal operation.

3. The method according to claim 1, wherein the sending the synchronization signal includes sending a linear frequency modulated signal.

4. The method according to claim 1, wherein the determining the time delay includes mixing, using a mixer, the return signal from each of the slave MIMO radar systems with the synchronization signal and filtering an output of the mixer to isolate a difference between the synchronization signal and the respective return signal.

5. The method according to claim 1, further comprising using the time delay to process subsequent received reflections by the master MIMO radar system and each of the slave MIMO radar systems resulting from a transmission by a transmission element of one of the slave MIMO radar systems.

6. A plurality of multi-input multi-output (MIMO) radar systems on a platform, the plurality of MIMO radar systems comprising:
    a master MIMO radar system among the plurality of MIMO radar systems, the master MIMO radar system including a linear frequency modulator;
    slave MIMO radar systems among the plurality of MIMO radar systems, the slave MIMO radar systems being all the plurality of MIMO radar systems other than the master MIMO radar system, wherein each of the slave MIMO radar systems receives an output of the linear frequency modulator through a modulator splitter as a synchronization signal over respective cables and sends a return signal to the master MIMO radar system over the respective cables; and a processor of the master MIMO radar system configured to determine a time delay between the master MIMO radar system and each of the slave MIMO radar systems based on a frequency difference between the synchronization signal and the respective return signal.

7. The plurality of MIMO radar systems according to claim 6, wherein the synchronization signal is at a lower frequency than a regular signal transmitted during normal operation of the plurality of MIMO radar systems.

8. The plurality of MIMO radar systems according to claim 6, wherein the synchronization signal is a linear frequency modulated signal.

9. The plurality of MIMO radar systems according to claim 6, further comprising a plurality of mixers each configured to mix the synchronization signal and the respective return signal of each slave MIMO radar system and a plurality of filters each configured to filter an output of the respective mixer to isolate a difference between the synchronization signal and the respective return signal, wherein the processor uses the difference to determine the time delay.

10. The plurality of MIMO radar systems according to claim 6, wherein a receiver section of the master MIMO radar system uses the time delay to process subsequent received reflections resulting from a transmission by a transmission element of one of the slave MIMO radar systems.

11. The plurality of MIMO radar systems according to claim 6, wherein the platform is an automobile.

* * * * *